Feb. 7, 1967  D. B. HOOVER ET AL  3,303,410
ROTATING RECTIFIER EXCITER GROUND DETECTION ARRANGEMENT
Filed Feb. 7, 1964

WITNESSES
Theodore F. Wrobel
Edward F. Possessky

INVENTORS
Dillon B. Hoover
and Bernard B. Wiper
BY
ATTORNEY

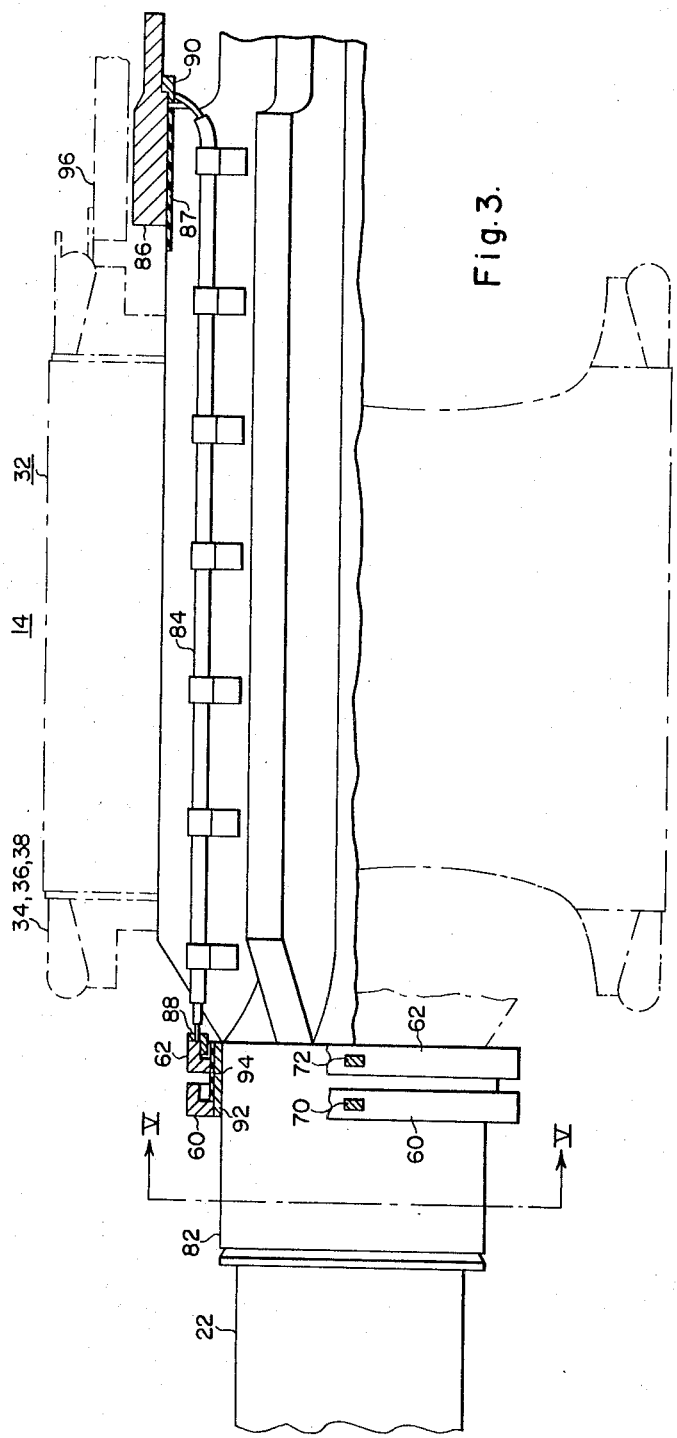
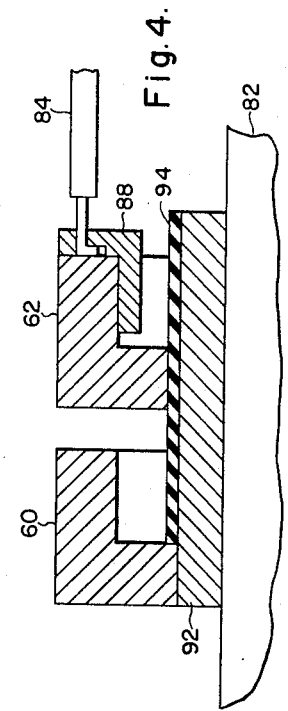

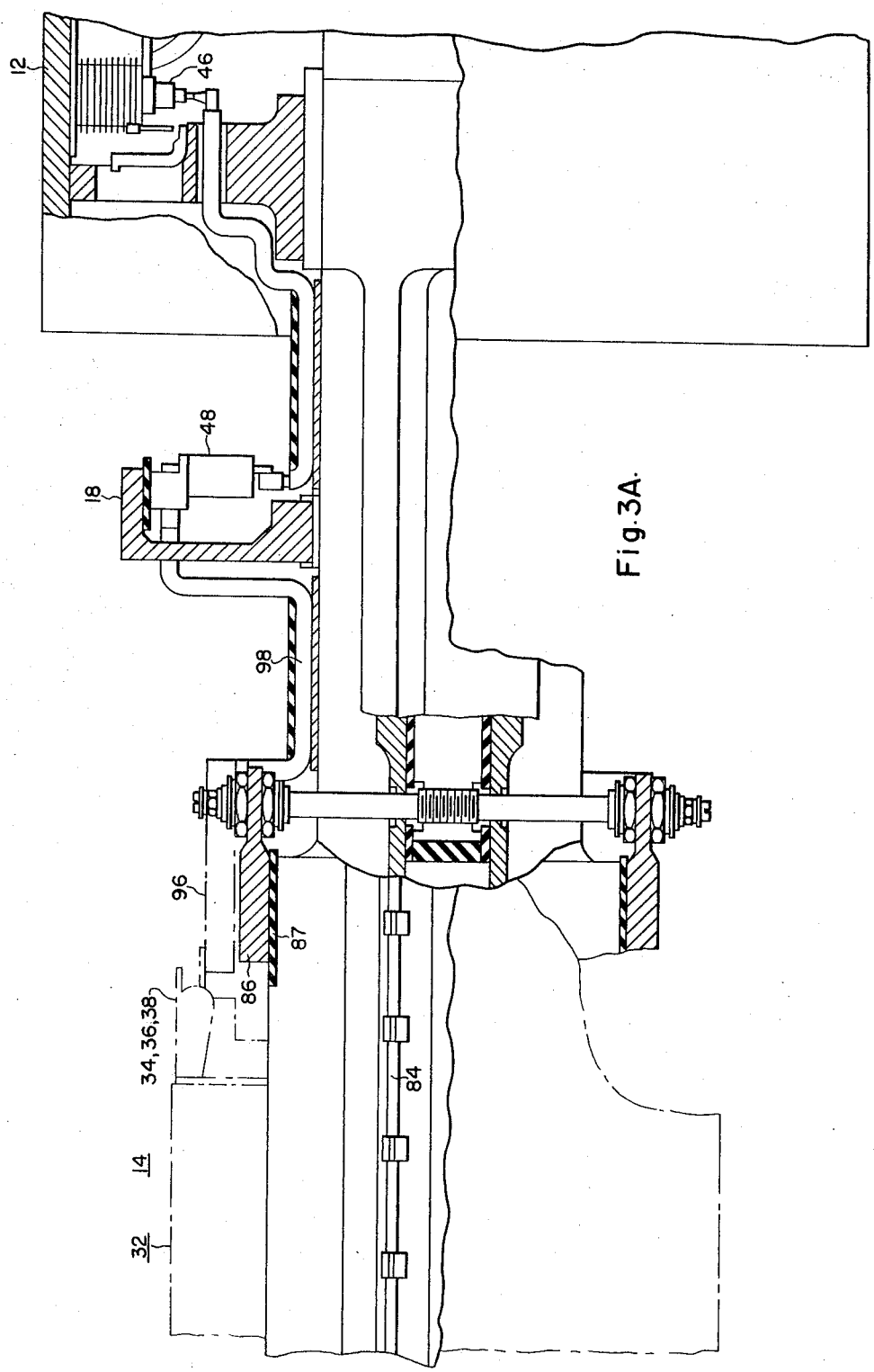

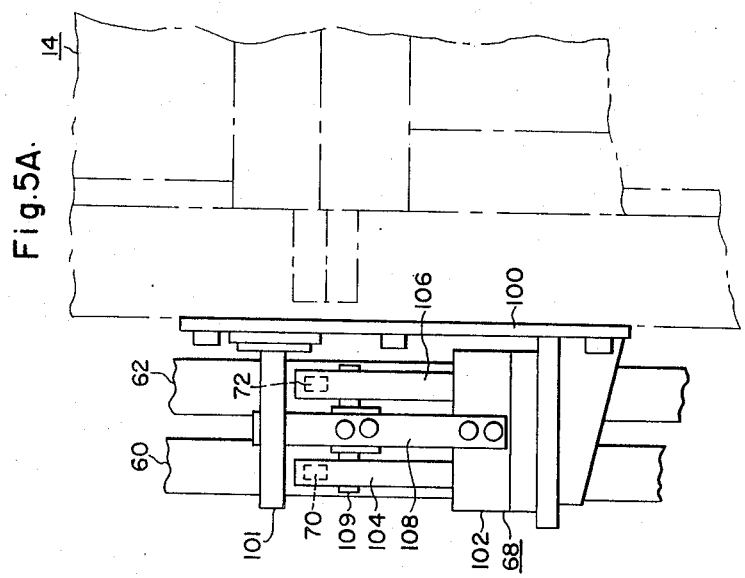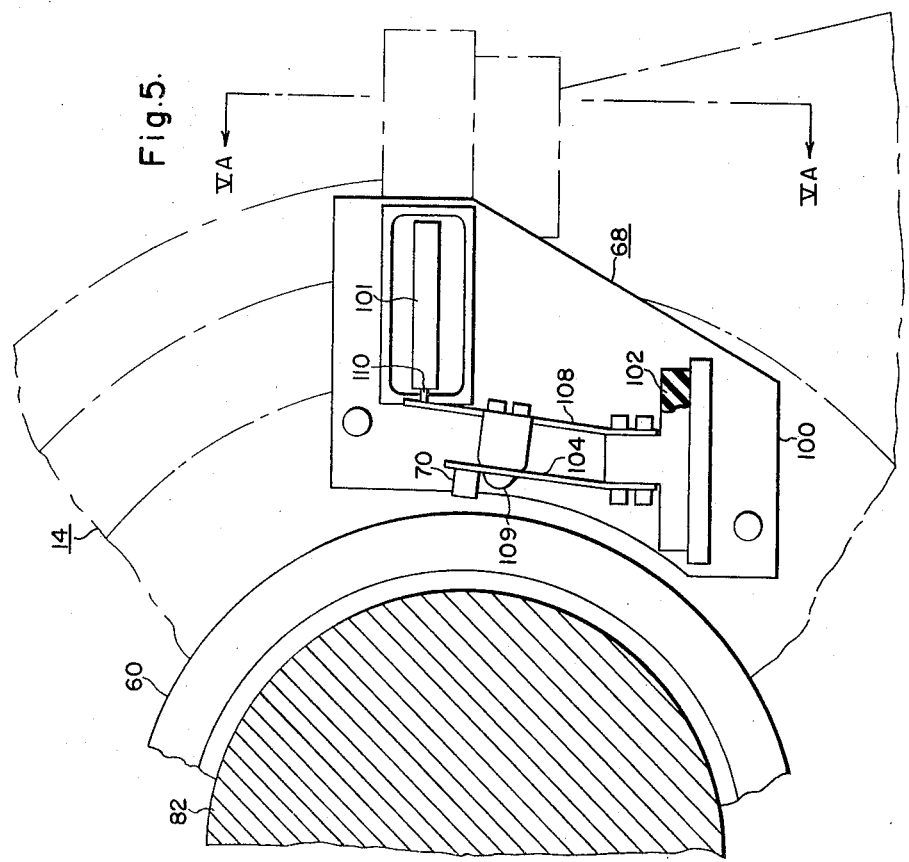

United States Patent Office 3,303,410
Patented Feb. 7, 1967

3,303,410
ROTATING RECTIFIER EXCITER GROUND DETECTION ARRANGEMENT
Dillon B. Hoover, Edgewood, and Bernard B. Winer, Pittsburgh, Pa., assignors to Westinghouse Electric Corporation, Pittsburgh, Pa., a corporation of Pennsylvania
Filed Feb. 7, 1964, Ser. No. 343,320
6 Claims. (Cl. 322—99)

The present invention relates to brushless A.C. power generating systems, and more particularly to ground detecting arrangements in rotating rectifier exciters which form a part of such systems.

One of the primary objects of exciting a synchronous generator with a rotating rectifier is to provide efficiency and reliability for power generating systems through the concept of "brushless" operation. To this end, a pilot exciter and a regulator provide controlled field energization for a main exciter, and a rotating armature of the main exciter in turn produces an alternating voltage which is applied to a rotating rectifier physically disposed with the main exciter armature on a common shaft. The rectified voltage is then applied to the main generator rotating field winding which is also disposed on the common shaft, and "brushless" delivery of generator excitation power (say up to 4,000 kilowatts or more) is thereby achieved. Usually, the pilot exciter has a permanent magnet field and is also driven by the common shaft, but a separate motor-generator set can be used for pilot excitation. Efficiency and reliability are achieved through the elimination of maintenance and replacement problems normally associated with brushes, commutators and collector rings.

It is thus paramount that the "brushless" concept be maintained whenever it is desirable or necessary to provide additional or more specific operating features in a power generating system having a rotating rectifier exciter. One such case is presented by a need for detecting ground faults in the excitation circuit which includes the armature of the main exciter, the rectifier circuitry and the main generator field. Such faults, although usually infrequent, desirably should if possible be detected before major damage results in the excitation circuit components from overheating and arcing. Further, in the interest of operating economy and operating facility, any detection scheme should be operable without a requirement for generator shutdown yet within the framework of the "brushless" concept.

Thus, in accordance with the principles of the present invention, there is provided in a rotating rectifier exciter a ground detection arrangement comprising at least one and preferably a pair of shaft mounted conductor means or collector rings respectively connected electrically to the shaft (ground) and to a suitable point in the rotating excitation circuit or the main exciter armature windings (above ground). Respective normally disengaged brushes are provided for contacting the collector rings when it is desired to test for a ground fault. Meter means provided in the ground detection arrangement are than cooperatively employed to indicate the presence or absence of a ground fault. Since the ground tests can be made relatively infrequently and since each test when made need only require brush and ring contact for a short period of time, conformity to the "brushless" concept is essentially achieved.

It is therefore an object of the invention to provide in a rotating rectifier exciter a novel ground detection arrangement which operates efficiently and accurately.

Another object of the invention is to provide in a rotating rectifier exciter a novel ground detection arrangement which operates substantially in a "brushless" manner.

These and other objects of the invention will become more apparent upon consideration of the following detailed description along with the attached drawings, in which:

FIG. 3 is a longitudinal view along a portion of the axis of a rotating rectifier exciter constructed in accordance with the principles of the invention and shown partly in outline, partly in section, and partly cutaway;

FIG. 3A is a view similar to FIG. 3 but is taken along an adjacent portion of the rectifier exciter axis;

FIG. 4 shows an enlarged section of a ground detector collector ring and a lead connection thereto as employed in the arrangement of FIG. 3;

FIGS. 5 and 5A show a brush assembly employed in conjunction with ground detector collector rings in the arrangement of FIG. 3 as viewed respectively from reference planes V—V of FIG. 3 and VA—VA of FIG. 5.

Figure 1:
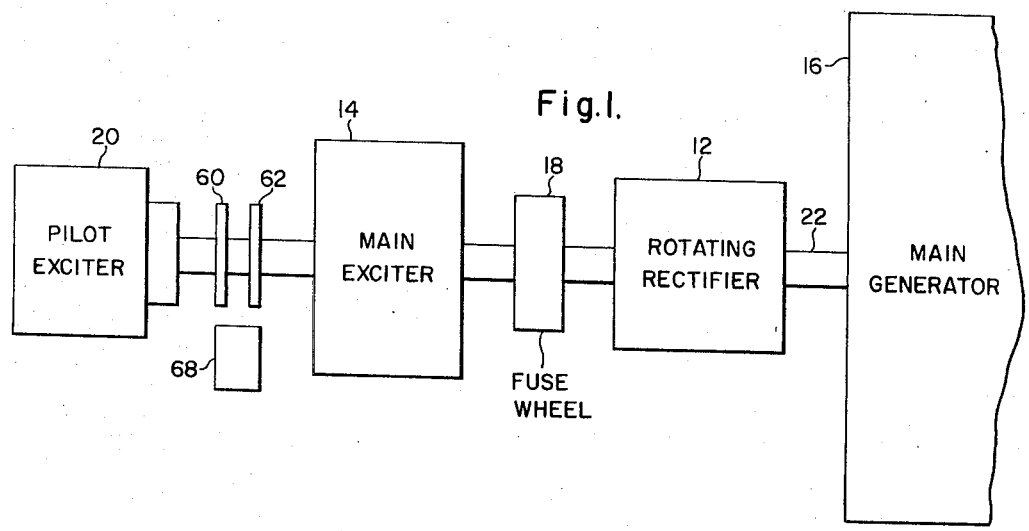
FIGURE 1 is a schematic view of a power generating system wherein there is incorporated a rotating rectifier exciter constructed in accordance with the principles of the invention.

More specifically, to illustrate the principles of the invention, there is shown schematically in FIG. 1 an A.C. power generating system 10 in which there is employed a rotating rectifier 12 and a main exciter 14 which provides field energization for a main generator 16 through the rotating rectifier 12. If desired, one or more fuse wheels 18 are suitably disposed in the system 10 and interconnected between the main exciter 14 and the rotating rectifier 12 for the purpose of diode circuit protection. The main exciter 14 receives its field energization from a pilot exciter 20. Preferably, a mechanically common shaft 22 is provided for the power system 10, and when it is rotated by a suitable source of mechanical power the power system 10 is electrically self-started and self-sustained by means of the pilot and main exciters 20 and 14.

Figure 2:
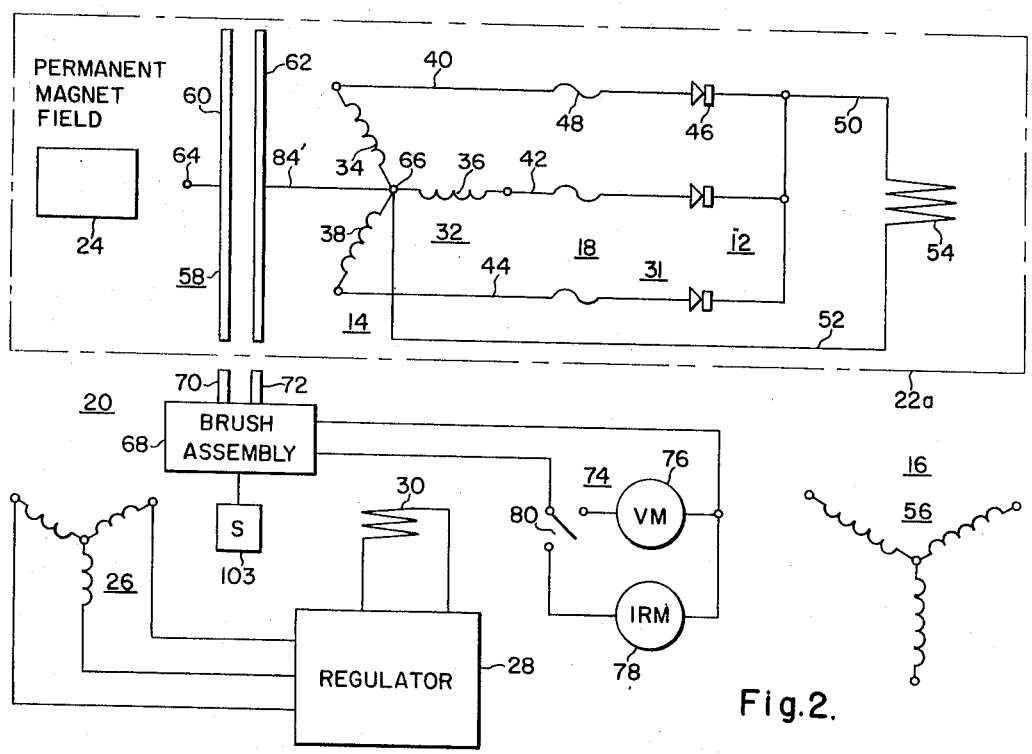
FIG. 2 shows a schematic circuit of the system shown in FIG. 1.

In the circuit schematic of FIG. 2, the shaft 22 is shown in dot-dash outline 22a so as to indicate clearly those electrical and magnetic components which undergo rotation. Thus, a permanent magnet field member 24, which can be of overhung construction (not shown) from the associated end of the shaft 22, is electromagnetically related to a stationary armature 26 in the pilot exciter 20 so that pilot voltage (usually A.C.) is applied to regulator 28 when the shaft 22 is rotated. If the overhung construction is employed for the pilot field member 24, then the stationary armature 26 can be disposed within the field member 24 and generally in line with the axis of the shaft 22.

The regulator 28 is suitably organized to control the voltage (D.C.) applied to a stationary stator field 30 of the main exciter 14. This control is based in any well known manner, upon main generator loading and other feedback and command information. A main excitation circuit 31 thus includes a rotating armature 32 which is electromagnetically related to the D.C. field 30 in the main exciter 14, and in this instance the exciter armature 32 generates three-phase A.C. voltages in respective phase windings 34, 36 and 38 (Y connected, 3 wire or, as here, 4 wire neutral return) but other winding arrangements can be employed according to the voltage generating characteristics desired.

An electrical output of the armature windings 34, 36 and 38 is transmitted in the excitation circuit 31 through conductors 40, 42 and 44 respectively (FIG. 2) (or conductors including conductor means 96 and 98 in FIG. 3A) to diodes 46 (only representatively shown) in the rotating rectifier 12 through fuses 48 (only representatively shown) which are physically disposed in fuse wheel 18. Rectified or D.C. voltage is thus applied through excitation circuit conductor 50 and neutral return conductor 52 to field windings 54 on the rotor of the main generator 16. Generated power voltage then appears across a stationary armature 56 of the main generator 16.

It is thus apparent that although rotating components are employed in the process of converting mechanical energy to electrical energy, there is no need in the power generating system 10, as thus far described, for establishing electrical connections between stationary and rotating components through brushes, commutators nor collector rings of the like. Hence, the system 10 is characterized as a "brushless" system.

In keeping with the essentials of the "brushless" concept, a ground detection arrangement 58 is provided for the rotating main exciter armature 32. The ground detection arrangement 58 thus includes one or more but preferably two conductor means or collector rings 60 and 62 which are disposed on the shaft 22 as shown schematically in FIG. 1. From a circuit viewpoint, as shown in FIG. 2, the collector ring 60 is connected to common or ground 64 which physically can be the shaft 22. The collector ring 62 is insulated from the shaft 22 and is connected electrically to some electrical point in the excitation circuit 31 or the armature winding combination 34, 36 and 38, but preferably (as indicated by reference character 84') to neutral point 66 particularly if a wire or other connector is already established at this point as in the illustrated 4 wire neutral return combination.

To complete the ground testing circuit, a brush assembly 68 is disposed in a stationary position for cooperative employment with the collector rings 60 and 62. Thus, when respective brushes 70 and 72 are contacted with the collector rings 60 and 62, a connection is made from the stationary brush assembly 68 to the rotating collector rings 60 and 62 and the voltage between the brushes 70 and 72 is then determinative of whether a proper insulation level exists between the excitation circuit 31 or the rotating armature windings 34, 36 and 38 and the common 64 or shaft 22.

Meter means 74 are provided for ascertaining and indicating the test results, and since the brushes 70 and 72 are normally retracted and advanced to contacting positions only during the short time period of testing, it is clear that the ground detection arrangement 58 is provided essentially within the concept of "brushless" operation for the system 10. Thus, maintenance and replacement problems normally associated with brushes and collector rings during continual operation are avoided by reason of the intermittent nature of the operation of the brushes 70 and 72 and the collector rings 60 and 62. In addition, the ground detection arrangement 58 is operable for ground testing purposes consistently with the goal of avoiding any requirement that the system 10 be shut down.

The meter means 74 includes a voltmeter 76 and an insulation resistance meter 78, both being of any ordinary construction suitable for the application, and in addition a mechanical or electronic single pole double throw switch 80 which also can be of any well known construction suitable for the application.

Preferably, when the brushes 70 and 72 are advanced for a test reading, the voltmeter 76 is first actuated and read to give a voltage indication. If the voltage is high, then it is known that a path must exist through the excitation circuit 31 or the armature windings to ground and a fault is detected. If the voltage is low, however, it is probable that the reading merely indicates the "floating" or electrostatic voltage of the excitation circuit 31 or the armature windings 34, 36 and 38 relative to the common 64 (assuming that the neutral point 66 is ungrounded as is almost if not always the case in exciter units).

To confirm this conclusion drawn from the low voltage reading, the insulation resistance meter 78 is next brought into the testing circuit by operation of the switch 80 and a reading is then taken from the meter 78. If the insulation resistance reading is high, then the low reading of the voltmeter 76 is confirmed as being indicative of the absence of ground faults. However, if the insulation resistance meter 78 indicates an abnormally low insulation level, then a ground fault is detected. In this case, the fault probably is located in the excitation circuit 31 at a point electrically close to the connection point of the collector ring 62 to the excitation circuit 31 (or in the armature windings close to the neutral point 66 in this case) since the voltmeter 76 had indicated a low voltage reading. In any case, once a ground fault is detected, shut down of the power generating system 10 can be planned for repair purposes.

Mechanically, the ground detection arrangement 58 can be embodied in the power generating system 10 in the manner indicated in FIGS. 3–5. Thus, as shown in FIG. 3, collector rings 60 and 62 are disposed on portion 82 of the shaft or shaft means 22 and an insulated conductor 84 is extended from the collector ring 62 to phase paralleling ring 86 which is mounted on insulative ring 87 and corresponds electrically to neutral point 66 in FIG. 2. The conductor 84 is extended along the shaft means 22 within main exciter windings 34, 36 and 38 and the ends of the conductor 84 are respectively connected to the rings 62 and 86 by suitable means such as respective clamping plates 88 and 90.

The collector rings 60 and 62 are physically spaced from each other for electrical isolation therebetween and are disposed on a shaft portion 82 in any suitable manner such as by press fitting. In this instance, another ring 92 is disposed intermediately of the collector rings 60 and 62 and the shaft portion 82, and an insulative ring 94 (formed from mica or other suitable material) is disposed between the collector ring 62 and the intermediate ring 92 for the purpose of isolating the collector ring 62 electrically from the shaft means 22.

As shown in enlarged views in FIGS. 5 and 5A, the brush assembly 68 is formed by means of a fixed housing 100 relative to which there is mounted an insulative spring support member 102 (FIG. 5A) and a solenoid 101 which is actuable to control the position of brushes 70 and 72. Respective leaf spring members 104 and 106 are prestressed to provide desired contact pressure for the brushes 70 and 72 against the collector rings 60 and 62 and brush lifting cross member 109 is secured to another leaf spring member 108 which is prestressed normally to lift the brushes 70 and 72 into a retracted position from the collector rings 60 and 62 and against the spring bias of the springs 104 and 106. Armature 110 of the solenoid 101 is connected to the spring member 108 and when the solenoid is actuated the spring member 108 is depressed to release the springs 104 and 106 which in turn urge the brushes 70 and 72 into contact with the collector rings 60 and 62.

The solenoid 101 is of course actuable by any suitable switch means 103 (as shown in FIG. 2) when it is desired to make a test for ground faults with the ground detection arrangement 58.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. In a rotating rectifier exciter, a ground detection arrangement comprising at least one collector ring disposed in rigid and electrically insulative supporting relation on shaft means of said rectifier exciter, conductor means electrically connecting said ring to a predetermined circuit point in rotating excitation circuit means of said rectifier exciter, brush assembly means having a normally retracted brush actuable to contact said ring, means for contacting an electrically common ground in said rectifier exciter, and means for controlling the position of said brush and for electrically metering across said winding means circuit point and said ground point when said brush is advanced to contact said ring.

2. In a rotating rectifier exciter, a ground detection arrangement comprising a ground collector ring disposed in rigid and electrically conductive supporting relation on shaft means of said rectifier exciter, another collector ring disposed in rigid and electrically insulative supporting relation on said shaft means, conductor means electrically connecting said other ring to a predetermined circuit point in rotating excitation circuit means of said rectifier exciter, brush assembly means having a pair of normally retracted brushes actuable respectively to contact said rings, and means for controlling the position of said brushes and for electrically metering across said collector rings when said brushes are advanced to contact said rings.

3. In a rotating rectifier exciter, a ground detection arrangement comprising a ground collector ring disposed in rigid and electrically conductive supporting relation on shaft means of said rectifier exciter, another collector ring disposed in rigid and electrically insulative supporting relation on said shaft means, a conductor means electrically connecting said other ring to a predetermined circuit point in rotating armature winding means of an exciter portion of said rectifier exciter, brush assembly means having a pair of normally retracted brushes actuable respectively to contact said rings, means for controlling the position of said brushes, and metering means connectable across said collector rings through said brushes when said brushes are advanced to contact said rings, said metering means including a volt-meter in an insulation resistance meter severally connectable across said brushes through switching means.

4. In a rotating rectifier exciter, a ground detection arrangement comprising a ground collector ring disposed in rigid and electrically conductive supporting relation on shaft means of said rectifier exciter, another collector ring disposed in rigid and insulative supporting relation and in relatively close but physically spaced relation from said ground ring on said shaft means, conductor means electrically connecting said other ring to the neutral point in rotating armature three phase Y connected winding means of an exciter portion of said rectifier exciter, brush assembly means having a pair of brushes actuable respectively to contact said collector rings, means for controlling the position of said brushes, and means for metering across said collector rings when said brushes are advanced to contact said rings.

5. In a rotating rectifier exciter, a ground detection arrangement comprising a ground collector ring disposed in rigid and electrically conductive supporting relation on shaft means of said rectifier exciter, another collector ring disposed in rigid and insulative supporting relation and in relatively close but physically spaced relation from said ground ring on said shaft means, conductor means electrically connecting said other ring to the neutral point in rotating armature three phase Y connected winding means of an exciter portion of said rectifier exciter, brush assembly means having a pair of brushes actuable respectively to contact said collector rings, means for controlling the position of said brushes, and a voltmeter and an insulation resistance meter connectable across said brushes through switching means so as to indicate whether a ground fault exists in said armature winding means when said brushes are advanced to contact said rings.

6. In a rotating rectifier exciter, a ground detection arrangement comprising a ground collector ring disposed in rigid and electrically conductive supporting relation on shaft means of said rectifier exciter, another collector ring disposed in rigid and electrically insulative supporting relation on said shaft means, conductor means electrically connecting said other ring to a predetermined circuit point in rotating excitation circuit means of said rectifier exciter, brush assembly means having a pair of normally retracted brushes actuable respectively to contact said rings, and means for controlling the position of said brushes and for electrically metering across said collector rings when said brushes are advanced to contact said rings, said metering means including a voltmeter and an insulation resistance meter severally connectable across said brushes through switching means.

References Cited by the Examiner
UNITED STATES PATENTS

| 1,523,803 | 1/1925 | Goodwin | 324—51 |
| 1,655,465 | 1/1928 | Huber | 342—51 X |
| 2,217,435 | 8/1940 | Edler | 322—59 X |
| 3,158,806 | 11/1964 | Conrad | 324—51 |

FOREIGN PATENTS 892,468  3/1962  Great Britain.

MILTON O. HIRSHFIELD, *Primary Examiner.*
J. J. SWARTZ, *Assistant Examiner.*